United States Patent [19]

Hong

[11] Patent Number: 5,257,142
[45] Date of Patent: Oct. 26, 1993

[54] VIDEO CASSETTE RECORDER WHICH STORES SIGNAL DURING TAPE REPLACEMENT AND RECORDS STORED SIGNAL WITH NEXT SIGNAL IN PICTURE-IN-PICTURE FORMAT

[75] Inventor: Kwun P. Hong, Suwon, Rep. of Korea

[73] Assignee: Samsung Electronics Co., Ltd., Suwon, Rep. of Korea

[21] Appl. No.: 874,012

[22] Filed: Apr. 27, 1992

[30] Foreign Application Priority Data

Apr. 30, 1991 [KR] Rep. of Korea .................. 91-6950

[51] Int. Cl.$^5$ .................. H04N 5/78; H04N 5/262; H04N 5/272; G11B 27/02
[52] U.S. Cl. .................. 360/33.1; 360/14.1; 358/183; 358/335; 358/310
[58] Field of Search .................. 360/33.1, 14.1, 9.1, 360/91-92, 19.1; 358/335, 183, 310; 369/48

[56] References Cited

U.S. PATENT DOCUMENTS

| | | | |
|---|---|---|---|
| 4,752,834 | 6/1988 | Koombes | 358/335 |
| 4,774,582 | 9/1988 | Hahamada et al. | 358/183 |
| 5,032,926 | 7/1991 | Imai et al. | 358/335 |
| 5,057,925 | 10/1991 | Tsutsui et al. | 358/310 X |
| 5,113,259 | 5/1992 | Romesburg et al. | 358/183 |
| 5,144,454 | 9/1992 | Cury | 358/335 |

Primary Examiner—Andrew L. Sniezek
Assistant Examiner—Jennifer Pearson
Attorney, Agent, or Firm—Cushman, Darby & Cushman

[57] ABSTRACT

A video cassette recorder with a television signal storing function can display simultaneously a current television broadcasting signal as well as the television program content during the tape replacing time in picture-in-picture fashion, by adopting a solid state memory device for storing the television program content during the tape replacing time, without discontinuity of the television program content due to replacing the new tape.

7 Claims, 2 Drawing Sheets

VIDEO CASSETTE RECORDER WHICH STORES SIGNAL DURING TAPE REPLACEMENT AND RECORDS STORED SIGNAL WITH NEXT SIGNAL IN PICTURE-IN-PICTURE FORMAT

FIELD OF THE INVENTION

The present invention relates generally to a video cassette recorder (referred to as VCR hereinafter), and more particularly, to a VCR having a television signal temporarily storing function, when a tape end of the current video tape cassette is detected during recording a television signal, which can temporarily store an incoming television signal into a solid state memory device until the current cassette is replaced with a new cassette, and then record the mixed signal of the stored television signal during the cassette replacement and a next incoming television signal after completion of the cassette replacement onto the new cassette tape.

BACKGROUND OF THE INVENTION

In a conventional VCR, on recording a television program, when a tape end of the video cassette tape is detected by a tape end detecting sensor installed therein, a user ought to replace the cassette tape with a new video cassette tape and depress the record key for recording continuously the same television program. However, in such a case, there is a restriction that the user cannot record some of the content of a desired television program during the cassette tape replacing period, which is inconvenient for practical usage.

In consideration of such a restriction, a VCR of dual deck type has been proposed which is able to operate two decks complementarily as required. However, the VCR with the dual decks has caused various problems. Due to having two decks, it is complicated and requires a larger size in construction, and further it requires a higher cost in manufacture.

SUMMARY OF THE INVENTION

Preferred embodiments of the present invention aim to provide a VCR comprising only a single deck mechanism, which may prevent at least a video signal in the television program content from discontinuity or interruption occurring by such a cassette replacement.

Another aim is to provide such a VCR which is simplified and compact in construction and may be manufactured at low cost.

According to one aspect of the present invention, there is provided a video cassette recorder comprising:

recording unit for recording a video signal on a recording medium of a video cassette;

first detector unit for detecting an end portion of a recording medium of a video cassette operatively inserted in the recorder;

memory unit for storing video signals therein;

image mixing unit for mixing first and second image signals and outputting a mixed image signal which contains the first and second image;

second detector unit for detecting a beginning or an operational portion of a recording medium of a video cassette operatively inserted in the recorder; and control unit operative to store for a time interval an input video signal in the memory unit when the first detector unit detects at a first time point an end portion of a first recording medium during recording of the input video signal thereon; and to record subsequently on a second recording medium for the time interval a mixed image signal output by the image mixing unit when the second detector unit detects at a second time point a beginning or an operational portion of the second recording medium; the first and second images of the mixed image signal comprising respectively the current input video signal and the video signal stored in the memory unit, and the time interval comprising the interval between the first and second time points.

Preferably, the recording medium is a magnetic tape.

Preferably, the first and second detector unit are provided by a common device.

Preferably, the image mixing unit comprises a picture-in-picture signal generator.

Preferably, the first and second images are respectively a main picture and a sub-picture of the picture-in-picture signal.

Preferably, the memory unit comprises a solid state memory device.

According to another aspect of the present invention, there is provided a video cassette recorder comprising:

a single deck for driving a video tape in a predetermined operation mode selected by a user;

first detector unit for detecting an end portion of a tape of a video cassette operatively inserted in the recorder;

second detector unit for detecting a beginning or an operational portion of a tape of a video cassette operatively inserted in the recorder;

a tuner circuit for tuning a desired one of a plurality of television broadcasting signals received by an antenna;

an audio processing unit for processing and recording an audio signal from a television signal supplied by the tuner circuit on an audio track of a video tape, and for reproducing the same through a loudspeaker;

a video processing unit for processing and recording a composite video signal selected by the tuner circuit on a video track of the video tape, and reproducing the same;

a key matrix circuit for selecting various functions to control the video cassette recorder;

an analog-digital converter for converting the composite video signal supplied from the tuner circuit into a digital signal;

a solid state memory device for storing sequentially the digital signal output from the analog-digital converter at a predetermined address which is allowed by a system control circuit, and reading out the same under a control operation of the system control circuit;

a digital-analog converter for converting the digital signal output from the solid state memory device into an analog signal;

a picture-in-picture processing unit for processing the stored signal supplied from the solid state memory device through the digital-analog converter as a sub-picture and a television broadcasting signal supplied directly from the tuner circuit as a main picture, and combining both in a picture-in-picture fashion;

a switching unit having a first input contact to receive the television signal from the tuner circuit and a second input contact to receive the picture-in-picture signal from the picture-in-picture processing unit, and for producing one of the two input contact signals selectively at an output terminal thereof in response to control of the system control circuit; and a system control circuit connected with at least the deck, the audio processing unit, the key matrix circuit, the memory device, the picture-in-picture processing unit and the switching unit, for controlling the same in accordance with a predetermined operation mode selected by a user and a detecting signal given by the first or second detector unit, whereby the video processing unit will work in such a manner that:

when the video cassette recorder is set into a normal recording mode, the television signal selected by the switching unit is recorded onto the current-loaded cassette tape, when the video cassette recorder is shifted into a stop mode in response to the detection of a tape end of a current cassette tape by the first detector unit, until replaced by a new cassette tape, the television signal from the tuner circuit is stored sequentially into the solid state memory device; and when a beginning of the new cassette loaded inside the video cassette recorder is detected by the second detection unit and the video cassette recorder is again set into a normal recording mode, the combined signal of the main picture and the sub-picture from the picture-in-picture processing unit is selected by the switching unit and is recorded onto the new cassette tape.

BRIEF DESCRIPTION OF THE DRAWING

For a better understanding of the invention, and to show how the same may be carried into effect, reference will now be made, by way of example, to the accompanying diagrammatic drawings, in which.

DETAILED DESCRIPTION OF THE PREFERRED EMBODIMENT

Figure 1:
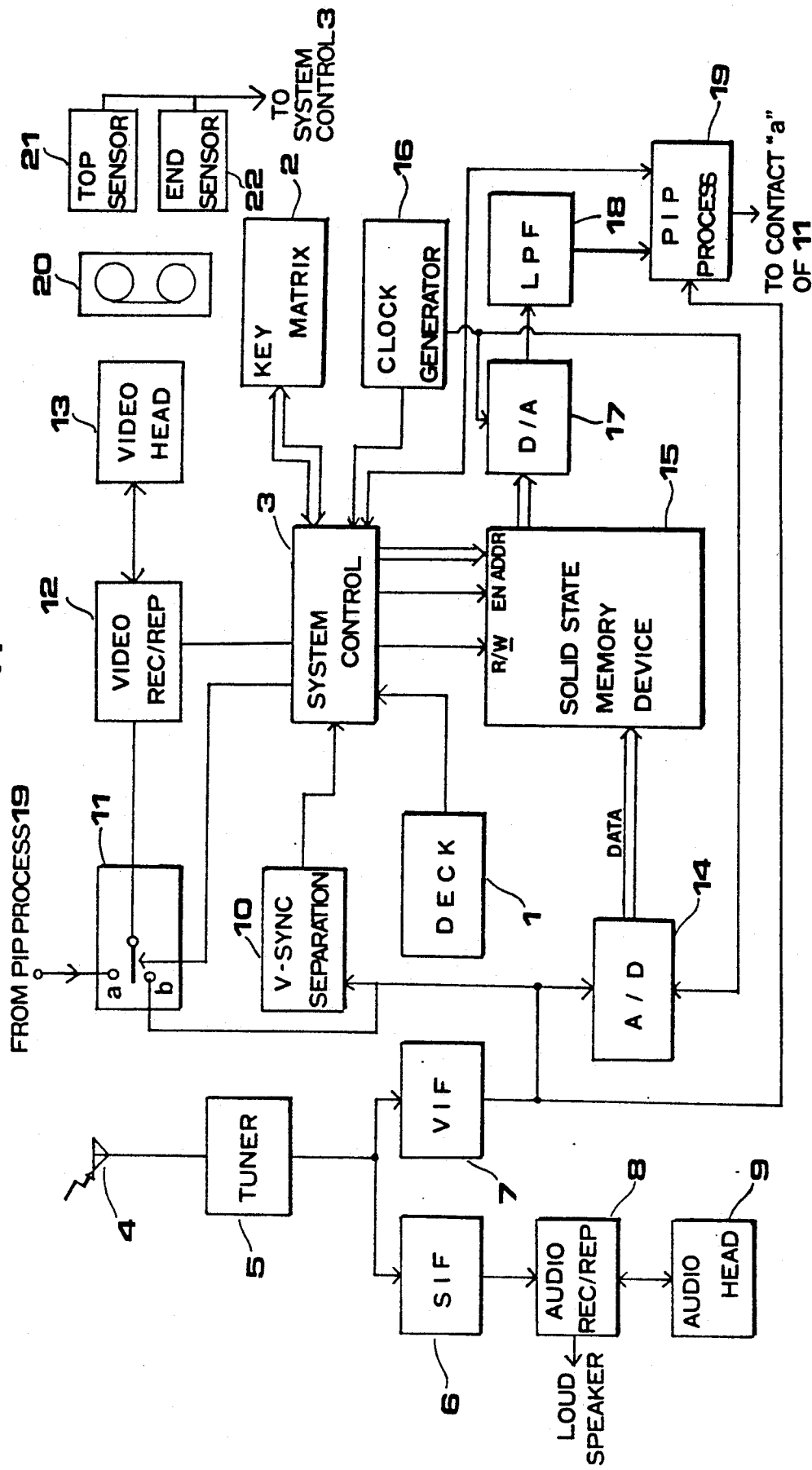
FIG. 1 is a schematic block diagram showing one example of a VCR according to an embodiment of the present invention.

Referring to FIG. 1, when a user wishes to record a television program, the user loads a video tape cassette 20 into a deck 1 of the VCR, and depresses a record key installed on a key matrix circuit 2. Then, a system control circuit 3 makes the various circuits shown in FIG. 1 operate so that the television program may be recorded onto a tape of the loaded cassette 20.

A television broadcasting signal received through an antenna 4 and a tuner 5 is supplied to a sound intermediate frequency (SIF) amplifier 6 for an audio signal and a video intermediate frequency (VIF) amplifier 7 for a video signal. The intermediate frequency (IF) amplifiers 6 and 7 operate to produce IF signals by mixing the received signals of high frequency with a certain local oscillator frequency. Referring to FIG. 1, it can be seen that blocks of the IF amplifiers 6 and 7 are arranged separately from the tuner 5. However, the tuner 5 may be designed to incorporate the IF amplifiers 6 and 7.

The audio IF signal from the SIF 6 is supplied to an audio recording/reproducing circuit 8 so that the received audio signal can be recorded on an audio track of the cassette tape (not shown) by an audio head 9 and/or played through a loudspeaker.

On the other hand, the composite video signal from the VIF 7 is supplied to a vertical synchronisation signal separation circuit 10 to separate a vertical synchronisation signal from the composite video signal. The vertical synchronisation signal is applied directly to the system control circuit 3. Further, the video signal from the VIF 7 is applied to one contact "b" of the switching unit 11, and then is transferred from an output terminal of the switching unit 11 to a video recording/reproducing circuit 12 under the control of the system control circuit 3. The video signal output from the video recording/reproducing circuit 12 is recorded on a video track of the cassette tape by a video head 13.

Moreover, the illustrated VCR, as is the case with a conventional VCR, includes the tape top detecting sensor 21 and the tape end detecting sensor 22. Each comprises an optical sensor and is disposed in the vicinity of the video cassette 20. The former 21 detects the passage of a leader portion having no magnetic material adhered thereto at the top (beginning) of the tape to generate a tape top detecting signal while the latter 22 detects the passage of the end of the tape, also having no magnetic material adhered thereto, to generate a tape end detecting signal. The tape top and end detecting signals are adapted to be applied to the system control circuit 3.

The above described construction may be utilized in recording a television signal in a normal manner. However, if the tape end is detected by the tape end detecting sensor 22 during normal recording, the system control circuit 3 recognizes the tape end detecting signal output from the tape end detecting sensor 22, and simultaneously terminates record mode. Further, the system control circuit 3 sets a read/write(R/$\overline{W}$) terminal of the memory 15 to "0" (low state), and the chip enable(EN) terminal of the memory 15 to "1"(high state), so that input data may be written to the memory device 15 at a predetermined address given by the system control circuit 3. The input data of the memory device 15 have digital form and are forwarded by an analog-to-digital-(A/D) converter 14 based upon the composite video signal from the VIF 7 under the control of a clock signal from a clock signal generator 16. Thus, the digitally converted signals are sequentially stored into the solid state memory device 15 by field units of the television picture until the tape top or a magnetic portion of a newly loaded video tape is detected.

Successively, when the tape top or the magnetic portion of the newly loaded video tape is detected by the tape top detecting sensor 21, the system control circuit 3 recognizes the same, and then switches over the switching unit 11 to the contact "a". At this time, the system control circuit 3 sets the read/write(R/$\overline{W}$) terminal of the memory device 15 to "1" (high state) in order to make the memory device 15 operative in read mode, and also sets an enable terminal of a picture-in-picture processing unit 19 to "1" (high state) in order to enable it. The data read out from the memory device 15 is converted into an analog signal by a digital-analog converter 17 under the control of the clock signal generator 16, and the analog signal is in turn supplied through a low pass filter 18 to one input terminal of the picture-in-picture processing unit 19. The picture-in-picture processing unit 19 is provided with another input terminal for receiving the current television signal supplied directly from the VIF 7. In such a case, the picture-in-picture processing unit 19 will produce a so-called picture-in-picture type signal by combining the stored signal supplied from the memory device 15 through the digital-analog converter 17 and the current TV broadcasting signal supplied directly from the tuner 5: the former may be processed as a sub-picture, while the latter as a main picture. The picture-in-picture signal supplied from the picture-in-picture processing unit 19 to the contact "a" of the switching unit 11 is passed through the switching unit 11 and then is processed in the video recording/reproducing circuit 12 to be recorded on the video tape (not shown) by a video head 13.

Figure 2:
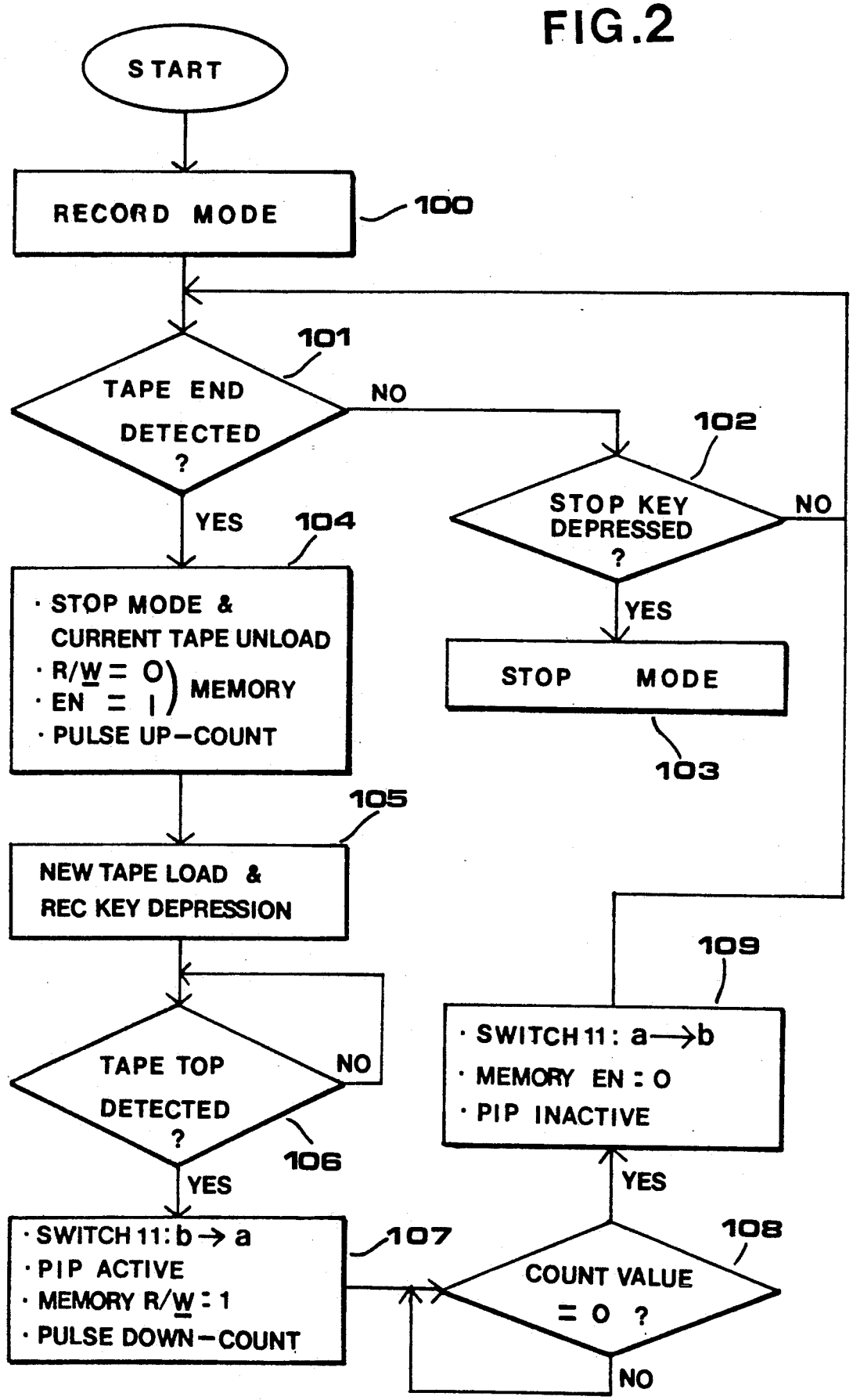
FIG. 2 is a flow chart for illustrating a control sequence in association with a system control circuit in accordance with the embodiment of the present invention shown in FIG. 1.

FIG. 2 is a flow chart illustrating a control sequence in association with a system control circuit 3 in accordance with an embodiment of the present invention shown in FIG. 1.

First, when a REC(record) key in the key matrix 2 is depressed in case that a video tape has been loaded into the deck 1 of the video tape recorder, the system control circuit 3 recognizes the same and sets a record mode (in the step 100).

Then, it is determined whether or not the tape end is detected in response to the detecting signal from the tape end detecting sensor 22 during the record mode (in the step 101).

When it is determined that the tape end is not detected and the user does not depress intentionally the stop key, the system control circuit 3 continues to determine whether or not the tape end is detected and the stop key is depressed (in the step 102). However, in case that the stop key is depressed, the system control circuit 3 identifies the same and further sets the stop mode, so that the operation of the record mode is terminated (in the step 103).

On the other hand, in the step 101, when the tape end is detected during normal record mode, the system control circuit 3 stops the record mode. Simultaneously, for storing temporarily the television signals into the solid state memory device 15 during the tape replacing time, the system control circuit 3 sets the Read/Write(R/W) terminal of the solid state memory device 15 to "0" (low state), and sets the chip enable (EN) terminal of the solid state memory device 15 to "1" (high state), and further measures the writing or storage time of the memory device to figure out the video tape replacing time (in the step 104).

The time during which the video signal is stored into the solid state memory device 15 can be measured by counting up in response to the vertical synchronisation pulses separated from the composite video signal during the video tape replacing time (i.e., the period between the timing at which the video tape end is detected by the tape end detecting sensor 22 and the timing at which the tape top or the magnetic portion of the newly loaded video tape is detected by the tape top detecting sensor 21) by means of a counter installed in the system control circuit 3.

When the record key is depressed after the video tape is newly loaded (in the step 105), the system control circuit 3 determines whether or not the tape top or the magnetic portion is detected in response to the detected signal from the tape top detecting sensor 21 (in the step 106). If the video tape is completely loaded and tape top is detected, the system control circuit 3 switches the switching unit 11 to the contact "a", and sets the Read/Write(R/W) terminal of the solid state memory device 15 to "1" (high state), and the picture-in-picture processing unit to an active state, and then enables the counter thereof to count down the final count-up value in response to the vertical synchronisation pulses in order to define the time intervals for recording the stored television signal into the new video tape with picture-in-picture mode (in the step 107).

In such a state, when the count value represented in the counter of the system control circuit 3 becomes "0" (in the step 108), that is, all the data stored in the solid state memory device during the tape replacing time are completely read out, the system control circuit 3 again switches the switching unit 11 to the contact "b", and sets both the picture-in-picture processing unit and the solid state memory device 15 into the disable or inactive state (in the step 109). Thus, only the current broadcasting television signal selected by the tuner 5 continues to be recorded in the normal record mode again.

As seen hereinabove, the system control circuit 3 responds to the detecting signals from the tape top and end detecting sensor 21 and 22, and automatically define a specific signal route through which even the on-air television broadcasting program during the tape cassette replacement can be held without lapse and recorded onto the newly loaded tape.

As a result, in the case of reproducing the video tape which has been recorded in the hereinabove manner, the connecting part of the recorded content can be displayed by picture-in-picture mode on the television screen to show no disconnection of the content due to video tape replacement.

Although video tape cassettes are by far the most popular recording medium for video signals at the present time, it is possible to apply the present invention to recording apparatus employing alternative recording media. Thus, the term "video cassette" is used conveniently herein to denote any suitable recording medium for a video signal, and is to be construed accordingly.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A video cassette recorder comprising:
   recording means for recording a video signal on a recording medium of a video cassette;
   first detector means for detecting an end portion of a recording medium of a video cassette operatively inserted in said recorder;
   memory means for storing video signals therein;
   image mixing means for mixing first and second image signals and outputting a mixed image signal which contains said first and second image;

second detector means for detecting a beginning or an operational portion of a recording medium of a video cassette operatively inserted in said recorder; and control means operative to store for a time interval an input video signal in said memory means when said first detector means detects at a first time point an end portion of a first recording medium during recording of the input video signal thereon; and to record subsequently on a second recording medium for said time interval a mixed image signal output by said image mixing means when said second detector means detects at a second time point a beginning or an operational portion of said second recording medium: the first and second images of said mixed image signal comprising respectively the current input video signal and the video signal stored in the memory means, and said time interval comprising the interval between said first and second time points.

2. A video cassette recorder according to claim 1, wherein said recording medium is a magnetic tape.

3. A video cassette recorder according to claim 1, wherein said first and second detector means are provided by a common device.

4. A video cassette recorder according to claim 1, wherein said image mixing means comprises a picture-in-picture signal generator.

5. A video cassette recorder according to claim 1, wherein said first and second image are respectively a main picture and a sub-picture of the picture-in-picture signal.

6. A video cassette recorder according to claim 1, wherein said memory means comprises a solid state memory device.

7. A video cassette recorder comprising:
a single deck for driving a video tape in a predetermined operation mode selected by a user;
first detector means for detecting an end portion of a tape of a video cassette operatively inserted in said recorder;
second detector means for detecting a beginning or an operational portion of a tape of a video cassette operatively inserted in said recorder;
a tuner circuit for tuning a desired one of a plurality of television broadcasting signals received by an antenna;
an audio processing unit for processing and recording the audio signal from the television signal supplied by the tuner circuit on an audio track of the video tape, and for reproducing the same through a loudspeaker;
a video processing unit for processing and recording the composite video signal selected by the tuner circuit on a video track of the video tape, and reproducing the same;
a key matrix circuit for selecting various functions to control the video cassette recorder;
an analog-digital converter for converting the composite video signal supplied from the tuner circuit into a digital signal;
a solid state memory device for storing sequentially the digital signal output from the analog-digital converter at a predetermined address which is allowed by a system control circuit, and reading out the same under a control operation of the system control circuit;
a digital-analog converter for converting the digital signal output from the solid state memory device into an analog signal;
a picture-in-picture processing unit for processing the stored signal supplied from the solid state memory device through the digital-analog converter as a sub-picture and a television broadcasting signal supplied directly from the tuner circuit as the main picture, and combining both in a picture-in-picture fashion;
a switching unit having a first input contact to receive the television signal from the tuner circuit and a second input contact to receive the picture-in-picture signal from the picture-in-picture processing unit, and for producing one of the two input contact signals selectively at an output terminal thereof in response to the control of the system control circuit; and
a system control circuit connected with at least the deck, the audio processing unit, the key matrix circuit, the memory device, the picture-in-picture processing unit and the switching unit, for controlling the same in accordance with a predetermined operation mode selected by a user and a detecting signal given by said first or second detector means,
whereby the video processing unit will work in such a manner that:
when the video cassctte recorder is set into a normal recording mode, the television signal selected by the switching unit is recorded onto the current-loaded cassette tape,
when the video cassette recorder is shifted into a stop mode in response to the detection of a tape end of a current cassette tape by said first detector means, until replaced by a new cassette tape, the television signal from the tuner circuit is stored sequentially into the solid state memory device; and
when a beginning of the new cassette loaded inside the video cassette recorder is detected by said second detection means and the video cassette recorder is again set into a normal recording mode, the combined signal of the main picture and the sub-picture from the picture-in-picture processing unit is selected by the switching unit and is recorded onto the new cassette tape.

* * * * *